United States Patent [19]
Lovendahl

[11] 3,856,427
[45] Dec. 24, 1974

[54] ADJUSTABLE BORING TOOL

[76] Inventor: Norman H. Lovendahl, 2728 N. Clinton St., River Grove, Ill. 60171

[22] Filed: Nov. 1, 1972

[21] Appl. No.: 302,890

[52] U.S. Cl................................. 408/182, 408/239
[51] Int. Cl.......................................... B23b 29/034
[58] Field of Search.......... 408/183, 182, 181, 185, 408/197, 238, 239, 199

[56] References Cited
UNITED STATES PATENTS

| | | | |
|---|---|---|---|
| 733,821 | 7/1903 | Dixon | 408/183 |
| 1,659,370 | 2/1928 | Magin | 408/183 |
| 2,623,420 | 12/1952 | Harris | 408/183 |
| 3,343,431 | 9/1967 | Boyer | 408/181 X |

FOREIGN PATENTS OR APPLICATIONS

| | | | |
|---|---|---|---|
| 176,095 | 3/1935 | Switzerland | 408/183 |
| 1,278,739 | 11/1961 | France | 408/183 |

*Primary Examiner*—Gil Weidenfeld
*Attorney, Agent, or Firm*—Alter Weiss Whitesel & Laff

[57] ABSTRACT

A boring tool including an adjustable boring block having a pair of spaced apart oppositely disposed tool inserts thereon. The boring block includes means for simultaneously and equally advancing each tool insert out from or toward the center of the boring block. An ancillary center differential adjustment is provided to positively equalize the distance between the tool inserts and the center. The blocks further include unique replaceable anvils or beds for receiving the tool inserts.

15 Claims, 8 Drawing Figures

Patented Dec. 24, 1974

ADJUSTABLE BORING TOOL

This invention relates generally to boring tools and more particularly to adjustable boring tools, of the type that have a pair of tool inserts or cutters oppositely disposed on a boring block.

Boring tools of the type that include a pair of tool inserts mounted on a boring block are generally used with the boring block held in a boring bar. As the boring bar rotates the tool inserts bore into the material taking a cut therefrom to form a bored hole of a desired diameter.

The boring process is expedited when means for varying the diameter of the cut made by the boring tool are provided. The presently available means used for varying the diameter of the cut of the boring tools are relatively unsophisticated and inefficient. For example, some presently available boring tools have the tool inserts mounted therein by clamps. To vary the diameters of the cut being taken it is necessary to loosen the clamp and slide the insert outward while measuring carefully with a micrometer at a master setting fixture to insure equalization of the distance of each of the inserts from the center of the boring block.

A slightly more sophisticated, presently available boring tool includes a taper pin located on the center of the boring block that is used for adjusting the distance from the center of each of the oppositely disposed spaced apart tool inserts. This means of adjusting the boring tool also requires a precise measuring operation on a locating surface.

Another deficiency of many of the presently available adjustable boring blocks or other tool holders is the integral bed or anvil used to receive the tool inserts. When there is a "catastrophic" misalignment the bed of the tool holder, or boring block is broken and the entire tool holder must be replaced.

Accordingly, an object of the present invention is to provide new and unique tool holders and especially adjustable boring tools.

A related object of this invention is to provide boring tools that are adjusted by a single operation to cause both of the oppositely disposed cutting ends of the tool to advance or regress equally from the center line or toward it.

Another object of this invention is to provide adjustable boring tools including boring block having oppositely disposed tool holding sections wherein both of the oppositely disposed sections can be adjusted to be equidistant from the center while the tool is mounted for actual use.

Yet another object of this invention is to provide adjustable boring blocks that are capable of being adjusted to vary the diameter of the bore while the tool is mounted for actual use.

Still another object of this invention is to provide adjustable boring tools having replacealbe beds for the tool inserts.

Still another and related object of this invention is to provide tool holders with replaceable beds for receiving the inserts, which beds can be replaced while the tool holders are mounted for actual use.

Still another object of this invention is to provide means for gaging the movement of the wrench used to move the oppositely disposed sections to or from the center when adjusting the diameter of the bore.

Still another object of the invention is to provide an adjustable boring tool having directional markings thereon indicative of the proper direction of turning the wrench to selectively increase or decrease the diameter of the bore.

In accordance with the preferred embodiment of this invention, the adjustable boring tool comprises a boring block having spaced apart, oppositely disposed, moveable sections. Each section has attached thereto and resting thereon a tool insert. Even, while the boring block is mounted on a boring bar, ready for actually cutting, a single wrench can move both sections of the boring block away from or toward the center of the boring block to thereby vary and adjust the diameter of the bore. A single wrench utilized with the boring block and turned in one direction moves both cutting ends of the boring block equally from the center. In addition, means are provided so that the cuttings ends of both sections of the block are simultaneously adjustable to be equidistant from the center of the boring block.

Also, in case of misalignment or other adversities causing catastrophic damage to the bed or anvil on which the insert is resting, a new bed can be installed while the tool is resting in the boring bar.

Graduations on the sides of the block juxtaposed to the wrench access apertures manifest the incremental arcuate distance moved by the wrench while making the desired adjustment. There are also markings on the sides of the block indicating the direction in which to move the wrench to actuate boring block tool sections outward or inward as desired.

Thus, unlike presently available boring blocks, the inventive tool described herein can be adjusted while mounted in position for actually boring. The absolute center of the boring block can be varied to assure alignment with the center of the boring bar. In case of damage to the tool insert bed, the entire boring block does not have to be replaced, since the bed itself is replaceable.

The above enumerated and other objects and features of the invention will now be explained in detail with the aid of the accompanying drawings, in which.

Figure 1:
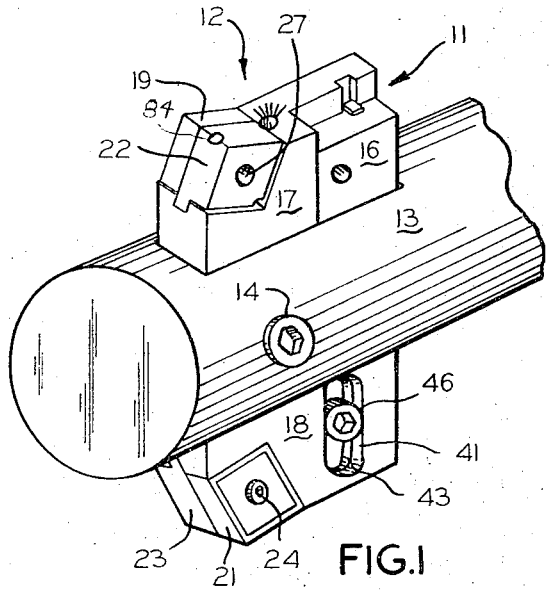
FIG. 1 is a pictorial view of the adjustable boring tool mounted in a boring bar.

FIG. 1 at 11 shows a boring block 12 mounted on a boring bar 13. Means, such as taper 14, are provided for coupling the boring block 12 to the boring bar, and for aiding in centering the boring block 12 in the boring bar.

The boring block comprises a stationary section 16, having coupled thereto a first moveable section 17 and a second moveable section 18.

Oppositely disposed and spaced apart on each of the moveable sections are cutting means or tool inserts, such as tool inserts 19 and 21 for doing the actual boring. Also the moveable sections 17, 18 include replaceable anvils or beds for receiving tool inserts 19 and 21, respectively. The tool insert is shown held in place on the bed by means such as clamp screw 24 which fits through an aperture 26 in tool insert 21 and screws into a tapped hole in the replaceable bed such as, for example, the tapped hole 27 on replaceable bed 22.

Figure 4:
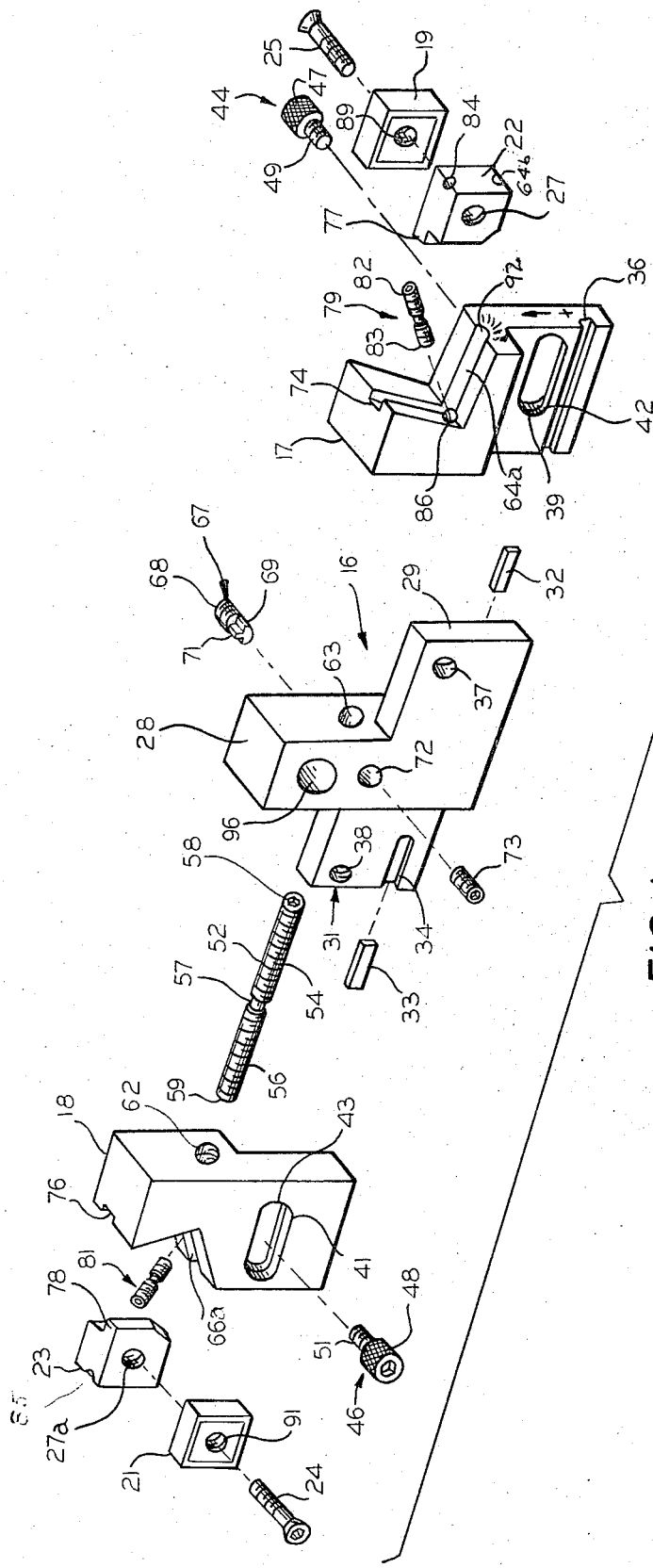
FIG. 4 is an exploded pictorial view of the adjustable boring block.

As best seen in FIG. 4, the stationary or fixed section 16 comprises a central rectangular section 28 from which there extends the first and second wing sections 29 and 31. Each of the wing sections 29 and 31 are approximately one half the length and one half the width of the central section 28. The wing sections both extend from the same portion of the length of the central section 28. Thus, both wing sections 29 and 31 are shown at the bottom of the central section 28, but they are at the opposite planar half of the width of the central section 28.

Means are provided to assure that the moveable sections 17, 18 of the boring block move in a straight line when they are actuated. The means shown herein are the keys 32 and 33 which are located in key-ways such as key-way 34 in wing section 31. Each of the moveable sections such as the moveable section 17 also has a keyway for receiving the key. For example, section 17 has a keyway 36 which mates with and receives key 32 to thereby assure that the moveable section 17 moves in a straight line when it is actuated.

Means are provided for retaining the moveable sections 17 and 18 on the wing sections 29 and 31, respectively, and none-the-less enables lateral movement. More particularly each of the wing sections 29 and 31 have tapped holes therein such as tapped apertures 37 and 38, respectively. Each of the moveable sections such as moveable sections 17 and 18 have characterized extended grooves therein such as grooves 39 and 41, respectively. There is a peripheral shoulder at the bottom of each of the grooves of the moveable sections, such as shoulder 42 in groove 39 and 43 in groove 41.

Fastening means such as retaining bolts 44 and 46 fit through the grooves 39 and 41, respectively and into the tapped holes 37 and 38, respectively. The bolts 44 and 46 each have a head section 47 and 48 followed by a threaded section 49 and 51. The retaining bolts are threaded into the tapped holes 37, 38 until the head section of each of the bolts 44 and 46 just rests on the shoulders 42 and 43, respectively to enable the moveable sections 17 and 18 to slide under the head sections of the screws, but to be retained on wing sections 29 and 31, respectively. The limitations of the movement towards the center and away from the center are defined by the lengths of the grooves 39, 41.

Means are provided for simultaneously moving both moveable sections equidistantly away from or toward the center of the central section 28. The means shown include the main differential screw 52, which has oppositely threaded sections 53 and 54 at opposite ends thereof joined together by a central unthreaded portion 57. The unthreaded portion 57 is shown as having a smaller diameter than the major diameter of the threads.

Preferably, means are provided at both ends of the main differential screw 52 for turning the screw either in a clockwise or counter-clockwise direction. More particularly, at each end of the screw there is shown an Allen head socket such as sockets 58 and 59.

Cooperating with the main differential screw 52 are threaded holes 61 and 62 in each of the moveable sections. The threads, of course, match with the threads of threaded sections 54 and 56, respectively.

A hole 63 traversing the central section 28 of the fixed section 16 enables the main differential screw to pass therethrough. The hole is larger in diameter than the major diameter of the screw portion of the main differential screw 52. Thus, on turning the main differential screw in a clockwise direction, for example, both sections move outwardly an equal amount from the center fixed section. Turning the main differential screw in a counter-clockwise direction actuates both moveable sections toward the center an equal amount. The main differential screw, can be turned from either side of the adjustable boring block and is available through the access openings which are located in each of the moveable sections such as access openings 64 and 66. Actually, the access opening in the moveable section is an arcuate section or semi-circular groove such as groove 64a in section 17 and 66a in section 18, and the access opening is completed by a similar matching semi-circular groove 64b, 66b, respectively in the replaceable bed section.

Means are provided for retaining the main differential screw 52 in the central fixed section 16 as well as for adjusting both moveable sections 17, 18 of the boring block to assure that the cutting ends of both are equidistant from the center of the boring block. This is accomplished through the use of cammed, headless screw 67. The cammed screw 67 has a top portion 68 having a complete threaded circumference and a bottom characterized portion. The characterized portion comprises an arcuate portion 69 that may also be threaded but comprises approximately one half of the circumference terminating in a centrally protruding elongated nipple portion 71. The threaded portion fits into a threaded aperture 72 which traverses the section 28. The aperture 72 is normal to and intersects the aperture 63 through which the main differential screw passes. The elongated nipple portion 71 of screw 67 extends into the non-threaded section 67 between the threaded sections 54 and 56 of the main differential screw 52. Thus, by turning the central adjustment screw 67, the the main differential screw 52 is moved by the extended nipple portion 71 to align the center point between the cutting surfaces and the actual center of the section 68.

Figure 6:
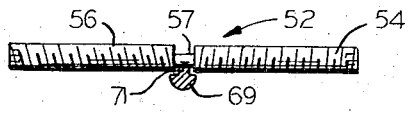
FIG. 6 is a plan view of the differential screw shown in FIG. 5 along with a cooperating center adjust screw.
Figure 8:
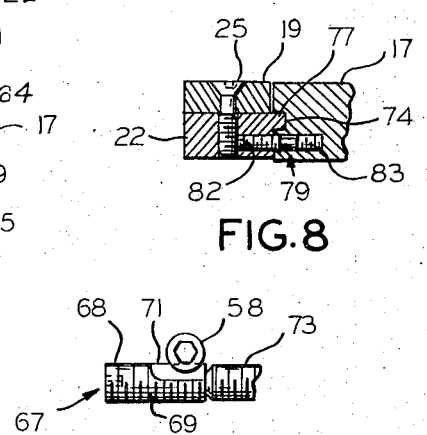
FIG. 8 is a sectional view taken through the tool insert shown in FIG. 2 and looking in the direction of the arrows 8—8.
Figure 7:
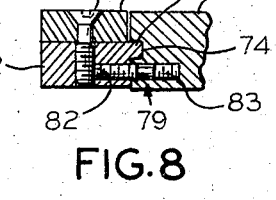
FIG. 7 is an end view of the main differential screw of FIG. 5 showing the cooperating center adjust screw and a locking screw therefor.

Means are provided for locking central adjustment screw 67. More particularly, a small headless set screw 73 is shown. When locking screw 73 is threaded into threaded aperture 72, it abuts the end of section 69, 71 of adjusting screw 67 to lock it in place. The relationship between the central adjustment screw 67, the main differential screw 52 and the set screw 73 can be seen particularly in FIGS. 6 and 7. As screw 67 is turned within a 90° arc, either clockwise or counter-clockwise, the center line of fixed section 16 is moved relative to the center line of the screw 5 normal to the axis of the screw. The relative movement is caused by the force of nipple portion 71 as it moves adjacent to portion 57 to abut either portion 54 or 56 of screw 52.

Means are provided for minimizing the adverse effect of any unfortuitous catastrophic misalignment of the boring block to the extent that the bed is destroyed. More particularly, as has been previously noted, the beds such as beds 22 and 23 are uniquely replaceable.

The beds are subjected to large stresses during the boring operations. Means are provided for taking up the stresses applied to the beds during the boring process. More particularly, an elongated notch is provided on each of the moveable sections such as elongated notch 74 on section 17 and elongated notch 76 on section 18. The beds are provided with extended flanges such as flange 77 and 78 which fit into the extended notches 74 and 76, respectively, when the bed is properly positioned on the moveable sections.

The beds are positioned and retained in place using means such as bed differential screws 79 and 81, respectively. Each of the screws has a left hand threaded portion at one end and a right hand threaded portion at the other end. For example, screw 79 has a left hand threaded portion 82 at the outward end and a right hand threaded portion 83 at the inner end. Thus, as the differential screw 79 is turned clockwise, for example, it enters deeper into a threaded aperture 86 in the moveable section 17 and, also, simultaneously enters the threaded section of aperture 84 in bed 22. Turning differential screw 79 clockwise pulls replaceable bed 22 closer to abutment with the side walls of moveable section 17. Screw 79 and more particularly thread 82 of screw 79 meshes with threaded aperture 84 which diagonally passes through bed 22. The portion of aperture 84 on the outside of aperture 27 does not need to be threaded. It provides access to the threaded portion of aperture 84 on the inside of aperture 27. An allen wrench passing through aperture 84 makes contact with replaceable bed differential screw 79 to either mount or dismount the replaceable bed. Similarly, bed 23 is mounted and dismounted as a function of the direction the differential screw 81 turns in threaded aperture 85 on the bed and 87 on moveable section 18.

The tool inserts 19 and 21 are mounted on the beds 22 and 23, respectively, after the beds are mounted onto the moveable sections. The tool inserts may be mounted in any well known manner such as using clamp screws 24 and 25 (as shown herein) which extend through non-threaded apertures 91 and 89, respectively on inserts 21 and 19. The clamp screws 24 and 25 mesh into the threaded apertures 27 and 27a in replaceable beds 22 and 23, respectively.

Figure 3:
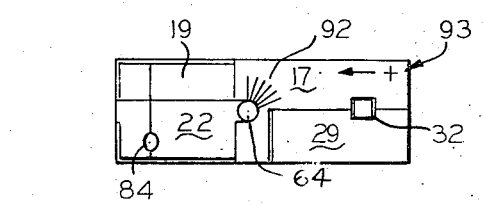
FIG. 3 is a side view of the boring block of FIG. 2 looking at the side opposite the one in which the wrench is shown inserted for adjustments.

Means are provided for gaging the amount of movement of the wrench needed in adjusting the boring tool to a desired dimension. More particularly, as best seen in FIG. 3, radial delineations 92 are provied at access hole 64. By aligning radial delineations 92 with the Allen wrench used in moving the moveable sections it is possible to gage the necesary arcuate movement of the wrench for a given movement of the cutting ends of the boring block.

Means are provided for indicating which direction to move the Allen wrench in order to increase the diameter of the bore. More particularly, as best seen in FIG. 3 at 93, a positive symbol along with an arrow indicated the direction in which to turn the Allen wrench to increase the diameter of the bore.

An aperture 96 is provided through section 28 of the boring block. The aperture 96, enables fastener 14 to attach the boring block to the boring bar 13.

Figure 2:
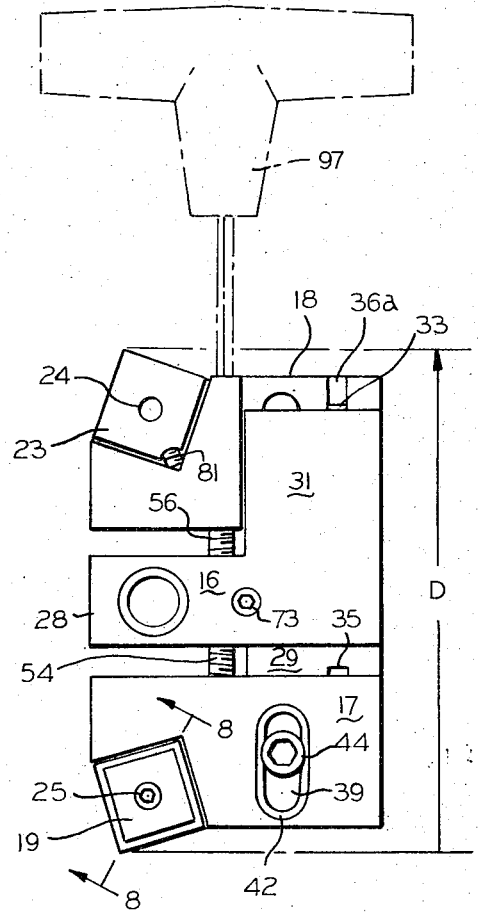
FIG. 2 is a plan view of the boring block making up the adjustable boring tool.
Figure 5:
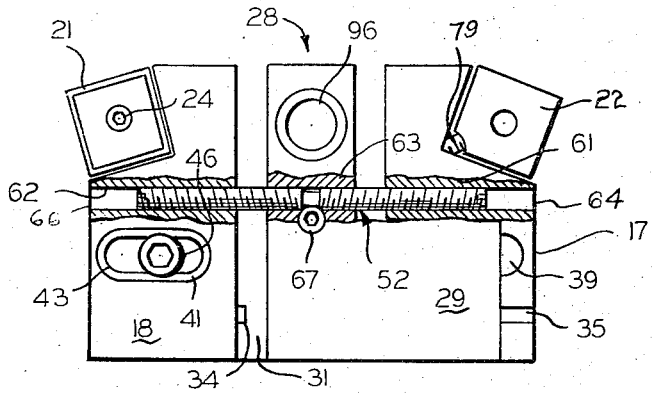
FIG. 5 is a plan view of the side opposite that shown in FIG. 2 with a partial section taken therefrom to more clearly show the differential screw arrangement used to simultaneously move both moveable parts of the boring block inward and outward from the center.

In operation, an Allen wrench such as Allen wrench 97 shown in FIG. 2, can be used at either end of boring block 12 to vary the diameter D of the hole bored using the boring block. The adjustment of the length of dimension D is made by inserting the Allen wrench in access opening 64 or 66 while the boring block is mounted on the boring bar and ready to perform the boring operation. Turning the Allen wrench simultaneously moves sections 17 and 18 equidistantly away from or toward the center of section 16 of the boring block. The total distance of the movement of sections 17 and 18 responsive to turning the differential fastener 52 is limited by fasteners 44 and 46 in grooves 39 and 41, respectively.

Keys and keyways such as keys 31 and 32 are provided to assure that the cutting ends of the boring block move in a straight line when the moveable sections are actuated by the rotation of the differential screw. Prior to mounting the boring block onto the boring bar, the center adjust screw 67 is operated to assure that both cutting ends are equidistant from the boring block.

This adjustment could also be made while the boring block is mounted on the boring bar if the boring bar is provided with access openings to the center adjust screw 67 and locking screw 73.

In case of catastrophic failure of the bed on which the cutting inserts rests, either due to inadvertancy or material fault, the destroyed bed can easily be replaced while the tool is mounted on the boring bar. This is accomplished by first removing the cutting insert from the bed or the remains of the cutting insert from the remains of the bed and loosening the differential screw such as screw 79, which holds the bed onto the boring block. The destroyed bed is replaced using the differential screw 79 and ascertaining that the flanges such as flange 77 meshes with the elongated notch such as notch 74.

While the principles of the invention have been described above in connection with specific apparatus and applications, it is to be understood that this description is made only by way of example and not as a limitation on the scope of the invention.

What I claim is:

1. An adjustable boring tool comprising a boring block,
    said boring block having oppositely disposed, spaced-apart cutting tools thereon,
    motion determining means for simultaneously advancing both of said cutting tools out from or toward the center of the boring block to adjust the diameter of the bore, and
    unitary means engaging said motion determining means for equalizing the distance between the center of said block and the cutting edge of each of said cutting tools by moving said motion determining means in either direction along its longtiduinal axis relative to the center of the boring tool.

2. The adjustable boring tool of claim 1 and means for retaining said equalized distance.

3. The adjustable boring tool of claim 1 wherein said boring block comprises a centrally located fixed section, a first and a second moveable section disposed on opposite sides of said fixed section, means for mounting said cutting tools on said moveable sections, and cooperating means on said moveable sections for cooperating with said motion determining means to simultaneously move both of said moveable sections to advance both of said cutting tools out from or toward the center of the boring block to adjust the diameter of the bore.

4. The adjustable boring tool of claim 3 wherein means are provided to assure linear movement of said moveable sections.

5. The adjustable boring tool of claim 3 wherein means are provided for limiting the movement of said moveable sections.

6. The adjustable boring tool of claim 3 wherein said motion determining means comprises a main screw, means for retaining said main screw in said central fixed section, even when said main screw rotates about its axis, and wherein said cooperating means on said moveable sections comprise threaded apertures for threadingly receiving said main screw therein to cause said moveable sections to move toward or away from the center of said block responsive to said main screw rotating about its own axis.

7. The adjustable boring tool of claim 6 wherein said fixed section comprises a central section, first and second wing sections oppositely disposed from said central section, said moveable sections shaped to ride on said wing sections and to abut said central section at the smallest diameter of the bore.

8. The adjustable boring tool of claim 7 wherein a groove is provided on each of said moveable sections, threaded hole means on said wing sections, said threaded hole being aligned with said groove, and threaded fastener means in said threaded holes passing into said grooves to limit the movement of said moveable sections.

9. the adjustable boring tool of claim 8 wherein said grooves include shoulder means around the bottom periphery of said groove, said threaded fastener means having head means thereon which loosely abut said shoulder means to slidingly attach said moveable sections to said fixed section.

10. An adjustable boring tool comprising a boring block, said boring block having a centrally located fixed section, a first and a second movable section disposed on opposite sides of said fixed section, means for mounting said cutting tools on said movable sections, each of said movable sections having a cutting tool oppositely disposed thereon, a main screw for simultaneously advancing both of said cutting tools out from or toward the center of the boring block to adjust the diameter of the bore, threaded apertures on said movable sections for cooperating with said main screw to simultaneously move both of said movable sections, means for retaining said main screw in said center fixed section even when said main screw rotates about its axis, said fixed section comprising a central section, first and second wing sections oppositely disposed from said central section, said moveable sections being shaped to ride on said wing sections and to abut said central section with the smallest diameter of the bore, groove means provided on each of said movable sections, threaded hole means on said wing sections, said threaded hole means being aligned with said groove means, threaded fastener means in said threaded holes passed through said holes to limit the movement of said movable sections, said groove means including shoulder means around the bottom periphery of said groove means, said threaded fastener means having head means which loosely abut said shoulder means to slidingly attach said movable sections to said fixed sections and a keyway provided in each of said wing sections, an aligned keyway in each of said movable sections aligned with the keyway in said wing sections, and a key for each of said aligned keyways to assure linear motion of said movable sections.

11. An adjustable boring tool comprising a boring block, said boring block having oppositely disposed spaced-apart cutting tools thereon, said boring block comprising a centrally located fixed section, a first and second movable section disposed on opposite sides of said fixed section, a main differential screw for simultaneously advancing both of said cutting tools out from or toward the center of the boring block to adjust the diameter of the bore, means for mounting said cutting tools on said movable sections, threaded holes on said movable sections for receiving opposite ends of said main differential screw to simultaneously move both of said movable sections, a non-threaded hole for enabling said differential screw to pass through said fixed section, said differential screw having a non-threaded portion of smaller diameter than the threaded portions thereof, cammed screw means, an intercepting threaded hole in said fixed section intercepting said non-threaded hole, said cammed screw means having a threaded top portion and a cammed bottom portion, and said cammed bottom portion reaching said non-threaded portion of said differential screw and shaped so that turning said cammed screw moves said main differential screw in said non-threaded hole to position said cutting tools relative to the fixed section.

12. The adjustable boring tool of claim 11, wherein locking screw means are provided to lock said cammed screw at a desired position.

13. The adjustable boring tool of claim 3 wherein said motion determining means comprises a main differential screw, means in said fixed section for receiving the central part of said main differential screw, said cooperating means comprising transverse threaded holes transversing said moveable sections and positioned to receive opposite ends of said main differential screw, an access opening in at least one of said moveable sections to enable turning said main differential screw while the adjustable boring block is mounted on a boring bar.

14. An adjustable boring tool comprising a boring block, said boring block having oppositely disposed spaced-apart cutting tools thereon, motion determining means for simultaneously advancing both of said cutting tools out from to toward the center of the boring block to adjust the diameter of the bore, said cutting tool comprising replaceable cutting inserts, beds on said boring block for receving said cutting inserts, means for attaching said beds to said block to enable replacement of said beds, said attaching means comprising side flanges on said beds, groove means on said block for receiving said side flanges, bed screw threaded hole means in said block, and bed screw means acting to pull said beds into contiguous relationship with said block.

15. The adjustable boring tool of claim 14 wherein said bed screw means comprises bed differential screws, and wherein corresponding threaded holes are provided in said beds.

* * * * *

UNITED STATES PATENT OFFICE
CERTIFICATE OF CORRECTION

Patent No. 3,856,427　　　　　　　　　Dated December 24, 1974

Inventor(s) Norman H. Lovendahl

It is certified that error appears in the above-identified patent and that said Letters Patent are hereby corrected as shown below:

IN THE SPECIFICATION

Col. 5, line 58; after "are", "provied" should be --provided--.

IN THE CLAIMS

Col. 9, line 19; after "from", "to" should be --or--.

Signed and sealed this 4th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,856,427     Dated December 24, 1974

Inventor(s) Norman H. Lovendahl

It is certified that error appears in the above-identified patent and that said Letters Patent are hereby corrected as shown below:

Column 4, line 54; after "the" (first occurrence), (second occurrence) should be omitted.

line 39, after "an", "allen" should be

-- Allen --.

Signed and Sealed this fourteenth Day of October 1975

[SEAL]

Attest:

RUTH C. MASON
*Attesting Officer*

C. MARSHALL DANN
*Commissioner of Patents and Trademarks*